United States Patent
Lynch

(10) Patent No.: US 7,578,070 B1
(45) Date of Patent: Aug. 25, 2009

(54) DIGITAL RING SIZING DEVICE AND ASSOCIATED METHOD

(76) Inventor: Stacy Lynch, 15644 Birmingham Cir., Brandywine, MD (US) 20613

( * ) Notice: Subject to any disclaimer, the term of this patent is extended or adjusted under 35 U.S.C. 154(b) by 111 days.

(21) Appl. No.: 11/881,707

(22) Filed: Jul. 27, 2007

Related U.S. Application Data

(60) Provisional application No. 60/820,921, filed on Jul. 31, 2006.

(51) Int. Cl.
G01B 3/10 (2006.01)
G01B 3/34 (2006.01)

(52) U.S. Cl. ............................. 33/514.1; 33/555.4

(58) Field of Classification Search ............ 33/514.1, 33/501.02, 501.03, 514.2, 555.1, 555.2, 555.4
See application file for complete search history.

(56) References Cited

U.S. PATENT DOCUMENTS

| | | | | |
|---|---|---|---|---|
| 235,507 A * | 12/1880 | Chapman | ................ | 33/514.1 |
| 766,911 A * | 8/1904 | Stemm | ................ | 33/514.1 |
| 947,879 A * | 2/1910 | Worstall | ................ | 33/514.1 |
| 1,216,672 A * | 2/1917 | Eisen | ................ | 33/514.1 |
| 1,277,075 A * | 8/1918 | Ingalls | ................ | 33/514.1 |
| 1,634,378 A * | 7/1927 | Mountford | ................ | 33/514.1 |
| 1,861,527 A * | 6/1932 | Grimm | ................ | 33/514.1 |
| 2,129,582 A * | 9/1938 | Johansson | ................ | 33/555.4 |
| 3,387,373 A * | 6/1968 | Harrington et al. | ........ | 33/679.1 |
| 3,744,140 A * | 7/1973 | Kyrk | ................ | 33/514.1 |
| 3,822,476 A * | 7/1974 | Leveridge | ................ | 33/679.1 |
| 3,967,383 A * | 7/1976 | Collins | ................ | 33/555 |
| 4,785,647 A | 11/1988 | Coleman | | |
| 4,964,222 A | 10/1990 | Keener | | |
| 5,212,871 A * | 5/1993 | Luccarelli | ................ | 33/555.4 |
| 5,269,069 A * | 12/1993 | Min | ................ | 33/514.1 |
| 5,590,450 A | 1/1997 | March | | |
| 6,253,459 B1 * | 7/2001 | Barnhill | ................ | 33/514.1 |
| 6,615,504 B2 * | 9/2003 | Oser | ................ | 33/555.4 |
| 7,437,827 B2 * | 10/2008 | Cho | ................ | 33/555.1 |

* cited by examiner

Primary Examiner—Christopher W Fulton

(57) ABSTRACT

A digital ring sizing device includes a cylinder removably positioned directly about the selected user finger, and a mechanism for determining a ring size of the selected user finger. The ring size determining mechanism is housed within an interior of the cylinder and connected directly thereto. A mechanism visually displays the determined ring size of the selected user finger, and is directly connected to an outer surface of the cylinder and further is electrically coupled to the ring size determining mechanism. The ring size of the user is automatically displayed in numeric characters by the visual displaying mechanism after the ring size determining mechanism calculates the ring size of the selected user finger.

12 Claims, 7 Drawing Sheets

DIGITAL RING SIZING DEVICE AND ASSOCIATED METHOD

CROSS REFERENCE TO RELATED APPLICATIONS

This application claims the benefit of U.S. Provisional Application No. 60/820,921, filed Jul. 31, 2006, the entire disclosure of which is incorporated herein by reference.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to ring sizing devices and, more particularly, to a digital ring sizing device for assisting a user to easily and accurately determine a ring size of a selected user finger.

2. Prior Art

During a visit to a jewelry establishment, it is common to determine a person's ring size for purchasing a ring or for adjusting a previously purchased ring. When determining ring size, a flexible measuring tape is typically wrapped around the perimeter of a finger at a location where a ring is to be worn. The measuring tape may include distance measuring indicia, such as inches or centimeters, which thereafter require referral to a chart or table to determine the appropriate ring size. Ring size indicia may alternatively be conveniently imprinted directly onto a surface of a flexible tape for directly determining ring size.

One prior art example shows a combined measuring device for indicating both the ring size of a user and the size of a gemstone, and includes an elongate housing having a hollow interior and a first measurement scale located along a length of the housing. The first measurement scale includes indicia representative of different ring sizes. An indicator is slidably mounted on the housing for movement along the measurement scale, with at least a portion of the indicator extending into the hollow interior of the housing. A flexible measuring band has a first end removably connected to an end portion of the housing and a second end connected to the indicator portion within the housing. The flexible measuring band forms a measuring loop outside of the housing such that movement of the indicator along the housing changes the size of the measuring loop to thereby adjust to the size of an object to be measured. A second measurement scale is located on a length of the flexible measuring band and includes indicia representative of distance. With this arrangement, the relative position of the indicator with respect to the first measurement scale is indicative of ring size when at least a portion of the object is located within the measuring loop, and the relative position of the second measurement scale with respect to the housing is indicative of gemstone size. The measuring band may be removed from the housing for independently measuring distance or other geometrical parameters. A groove or step may be formed on an inner surface of the measuring loop for holding an object being measured. Unfortunately, this prior art example is cumbersome to use and does not offer a means of digitally displaying the determined ring size of the user.

Another prior art example shows a ring sizer which can be inserted into an inside circumference of a band portion of a ring in order to self adjust the ring size to a wearer's finger. The ring sizer includes a plurality of elongated body sections having their end portions nestingly arranged with respect to each other. Each of the body sections is constructed to straddle the band portion of the ring. An arcuately shaped leaf spring functions as a retaining bar for supporting all of the body sections in a longitudinally adjacent relationship, with the body sections thereby forming an arcuate configuration. An arcuately shaped leaf spring functions as a biasing bar, which is curved in an opposing direction to the retaining bar to engage the ring band portion so that the arcuate configuration of the body sections conforms to the wearer's finger. Unfortunately, this prior art example does not allow the user to accurately measure the ring size of the selected user finger via an air bladder and switches respectively and subsequently display the determined size via a display screen.

Accordingly, a need remains for a digital ring sizing device and associated method in order to overcome the above-noted shortcomings. The present invention satisfies such a need by providing a device that is convenient to use, is lightweight yet durable in design, and assists a user to easily and accurately determine a ring size of a selected user finger. Such a device allows the user to quickly determine a ring size and purchase the properly sized ring while at the seller's place of business. The present invention is simple to use, inexpensive, and designed for many years of repeated use.

BRIEF SUMMARY OF THE INVENTION

In view of the foregoing background, it is therefore an object of the present invention to provide a device for a digital ring sizing device. These and other objects, features, and advantages of the invention are provided by a digital ring sizing device for assisting a user to easily and accurately determine a ring size of a selected user finger.

The device includes a cylinder removably positioned directly about the selected user finger. Such a cylinder conveniently includes a middle section that has axially opposed top and bottom ends with threaded outer surfaces. Such threaded outer surfaces effectively extend about an entire circumference of the middle section. The cylinder further includes coextensively shaped top and bottom sections respectively. The top section and the bottom section and the middle section advantageously have equally sized diameters respectively, and the top and bottom sections are independently and threadably attached to the top and bottom ends of the middle section.

The device further includes a mechanism for determining a ring size of the selected user finger. Such a ring size determining mechanism is conveniently housed within an interior of the cylinder and connected directly thereto. The ring size determining mechanism includes a motorized pump housed within the interior of the cylinder, a power source electrically coupled to the motorized pump, and a first toggle switch electrically coupled to the motorized pump and the power source respectively. Such a first toggle switch is advantageously disposed on the exterior surface of the cylinder.

The ring size determining mechanism further includes a first one-way valve electrically coupled to the first toggle switch and the motorized pump respectively. Such a first one-way valve is effectively opened when the toggle switch actuates the motor. A cylinder-shaped air bladder has a hollow chamber formed therein. Such an air bladder is directly coupled to the one-way valve and an inner surface of the middle section of the cylinder respectively. The air bladder is coextensively shaped with the middle section of the cylinder and advantageously formed from a durably resilient material.

The motorized pump effectively introduces a quantity of air into the hollow chamber of the air bladder via the first one-way valve when the user manipulates the first toggle switch during operating conditions. The first one-way valve and the first toggle switch advantageously cooperate to prohibit the quantity of air from prematurely and undesirably exiting the air bladder. The air bladder has an inner surface that expands toward a centrally registered axis thereof and about the selected user finger when the quantity of air is introduced into the hollow chamber of the air bladder. An internal air pressure of the air bladder is effectively increased to a predetermined level above an external ambient air pressure level during operating conditions.

The ring size determining mechanism further includes a pressure sensor attached directly to a top portion of the inner surface of the air bladder and further is electrically coupled to the power source. Such a sensor contacts the selected user finger when the air bladder expands. The sensor effectively generates and transmits an output signal based upon the instant diameter of the air bladder when the sensor contacts the selected user finger. A display interface is electrically coupled to the sensor and conveniently housed within the interior of the middle section of the cylinder, and receives the output signal from the sensor. Such an output signal carries a numerical value corresponding to the detected ring size of the user.

The ring size determining mechanism further includes a second toggle switch electrically coupled to the power source and effectively disposed on the exterior surface of the cylinder. Such a second toggle switch is coextensively shaped with the first toggle switch. A second one-way valve is electrically coupled to the second toggle switch and directly connected to the air bladder respectively. The second one-way valve advantageously cooperates with the first one-way valve to effectively prohibit the quantity of air introduced into the air bladder from prematurely and undesirably exiting the air bladder during operating conditions. The second one-way valve and the second toggle switch advantageously cooperate to allow the quantity of air introduced into the air bladder to exit therefrom such that the internal air pressure of the air bladder is in equilibrium with an external ambient air pressure when the second toggle switch is manipulated by the user.

The display interface includes a processor, a database containing a plurality of ring sizes corresponding to a plurality of detected diameters respectively of the air bladder, and a memory electrically coupled to the processor and including software instructions for calculating the ring size of the selected user finger based upon a detected diameter of the air bladder. The software instructions include a plurality of operating steps including requesting the detected diameter of the air bladder from the sensor, querying the database to locate the detected air bladder diameter, finding an associated one of the ring sizes that matches with the detected air bladder diameter, extrapolating the associated ring size, converting the associated ring size to a numerical value, and transmitting the numerical value to the display screen (herein described below).

The device further includes a mechanism for visually displaying the determined ring size of the selected user finger. Such a visual displaying mechanism is directly connected to an outer surface of the cylinder and further is electrically coupled to the ring size determining mechanism respectively. The ring size of the user is automatically displayed in numeric characters by the visual displaying mechanism after the ring size determining mechanism calculates the ring size of the selected user finger.

The visual displaying mechanism includes a liquid crystal display screen integrally attached to the exterior surface of the cylinder. Such a display screen is advantageously located intermediate of the first toggle switch and the second toggle switch respectively. The display screen is electrically coupled to the display interface.

A method for assisting a user to easily and accurately determine a ring size of a selected user finger includes the steps of removably positioning a cylinder directly about the selected user finger, and determining a ring size of the selected user finger. The ring size determining mechanism is housed within an interior of the cylinder and connected directly thereto. The steps further include visually displaying the determined ring size of the selected user finger. The visual displaying mechanism is directly connected to an outer surface of the cylinder and further is electrically coupled to the ring size determining mechanism respectively. The ring size of the user is automatically displayed in numeric characters by the visual displaying mechanism after the ring size determining mechanism calculates the ring size of the selected user finger.

The step of determining a ring size of the selected user finger includes the steps of housing a motorized pump within the interior of the cylinder, electrically coupling a power source to the motorized pump, and electrically coupling a first toggle switch to the motorized pump and the power source respectively. The first toggle switch is disposed on the exterior surface of the cylinder. The steps further include electrically coupling a first one-way valve to the first toggle switch and the motorized pump respectively. The first one-way valve is opened when the toggle switch actuates the motor. The steps further include coupling a cylinder-shaped air bladder that has a hollow chamber formed therein directly to the one-way valve and an inner surface of the middle section of the cylinder respectively. The air bladder is coextensively shaped with the middle section of the cylinder, and is formed from a durably resilient material.

The step of determining a ring size of the selected user finger further includes the step of introducing a quantity of air into the hollow chamber of the air bladder via the first one-way valve and the motor when the user manipulates the first toggle switch during operating conditions. The first one-way valve and the first toggle switch cooperate to prohibit the quantity of air from prematurely and undesirably exiting the air bladder. The air bladder has an inner surface that expands toward a centrally registered axis thereof and about the selected user finger when the quantity of air is introduced into the hollow chamber of the air bladder. An internal air pressure of the air bladder is increased to a predetermined level above an external ambient air pressure level during operating conditions.

The step of determining a ring size of the selected user finger further includes the step of attaching a pressure sensor directly to a top portion of the inner surface of the air bladder. The sensor is electrically coupled to the power source, and contacts the selected user finger when the air bladder expands. The sensor generates and transmits an output signal based upon the instant diameter of the air bladder when the sensor contacts the selected user finger. The steps further include electrically coupling a display interface to the sensor. The display interface is housed within the interior of the middle section of the cylinder and receives the output signal from the sensor. The output signal carries a numerical value corresponding to the detected ring size of the user.

The step of determining a ring size of the selected user finger further includes the steps of providing a processor, providing a database containing a plurality of ring sizes corresponding to a plurality of detected diameters respectively of the air bladder, and providing a memory electrically coupled to the processor and including software instructions for calculating the ring size of the selected user finger based upon a detected diameter of the air bladder. The software instructions include a plurality of operating steps including requesting the detected diameter of the air bladder from the sensor, querying the database to locate the detected air bladder diameter, finding an associated one of the ring sizes that matches with the detected air bladder diameter, extrapolating the associated ring size, converting the associated ring size to a numerical value, and transmitting the numerical value to the display screen (herein described below).

The step of determining a ring size of the selected user finger further includes the steps of electrically coupling a second toggle switch to the power source. The second toggle switch is disposed on the exterior surface of the cylinder, and is coextensively shaped with the first toggle switch. The steps further include electrically coupling a second one-way valve to the second toggle switch. The second one-way valve is directly connected to the air bladder. The second one-way valve cooperates with the first one-way valve to prohibit the quantity of air introduced into the air bladder from prematurely and undesirably exiting the air bladder during operating conditions. The second one-way valve and the second toggle switch cooperate to allow the quantity of air introduced into the air bladder to exit therefrom such that the internal air pressure of the air bladder is in equilibrium with the external ambient air pressure when the second toggle switch is manipulated by the user.

The step of visually displaying the determined ring size of the selected user finger includes the step of attaching a liquid crystal display screen to the exterior surface of the cylinder. The display screen is located intermediate of the first toggle switch and the second toggle switch respectively, and the display screen is electrically coupled to the display interface.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

It is noted the purpose of the foregoing abstract is to enable the U.S. Patent and Trademark Office and the public generally, especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

Figure 1:
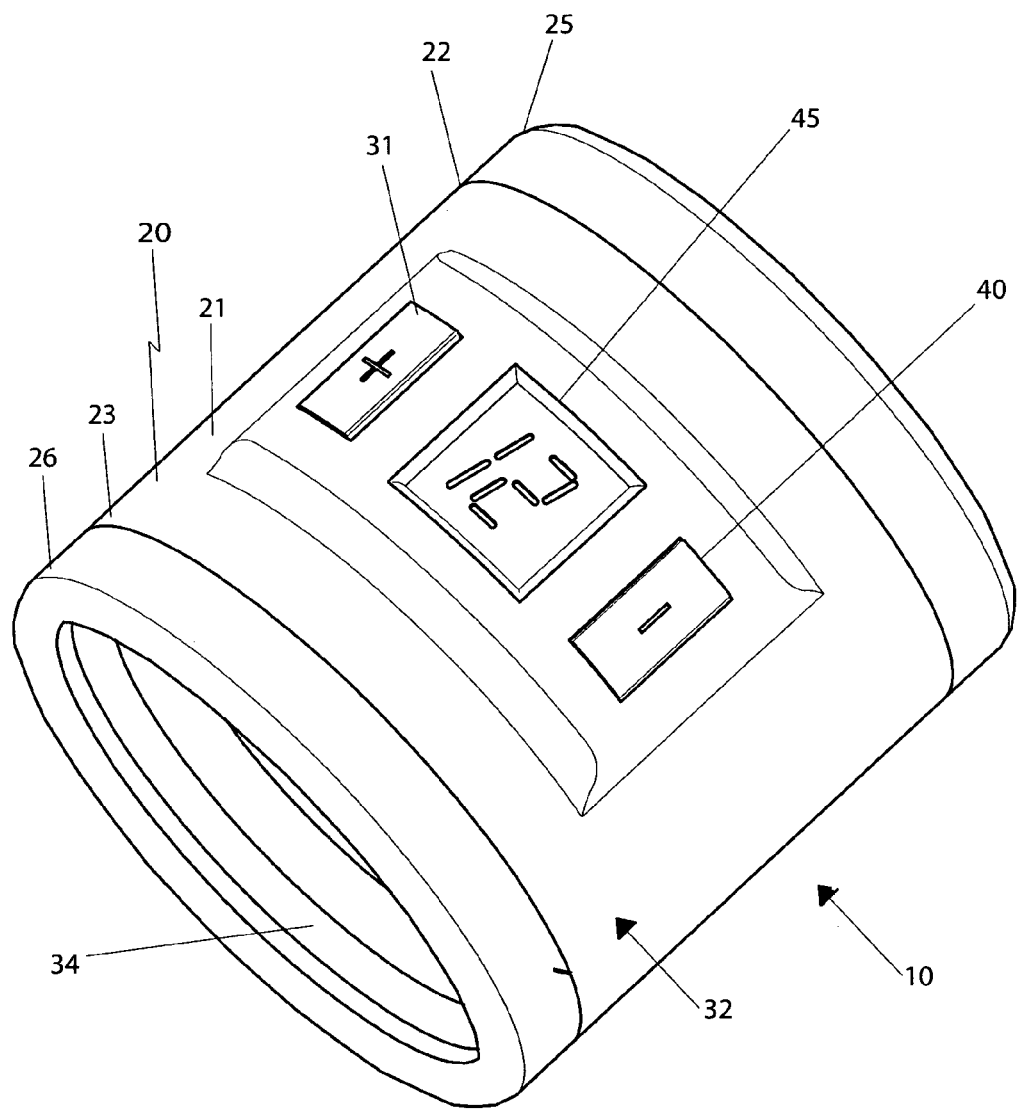
FIG. 1 is a perspective view of the cylinder, in accordance with the present invention.
Figure 2:
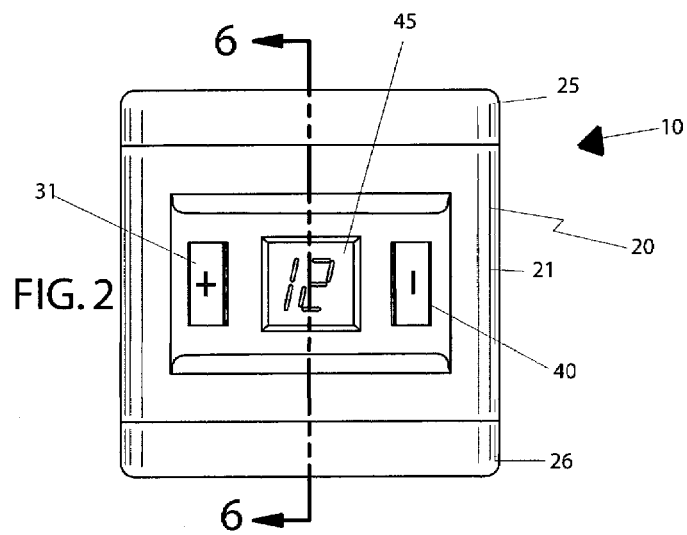
FIG. 2 is a top plan view of the cylinder shown in FIG. 1.
Figure 3:
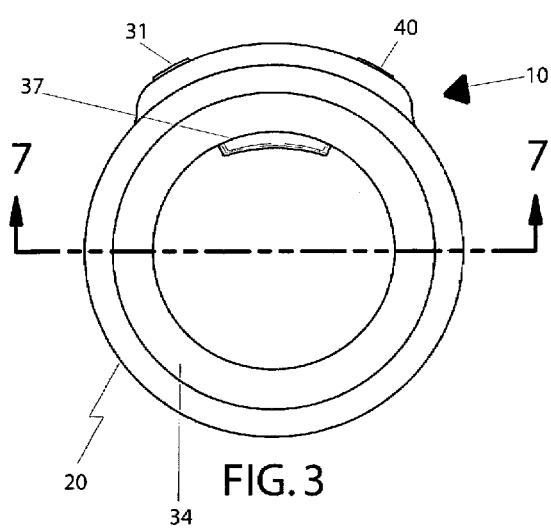
FIG. 3 is a front elevational view of the cylinder shown in FIG. 2.
Figure 4:
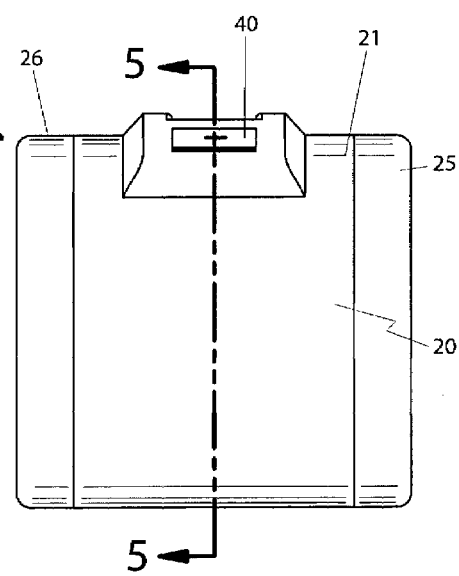
FIG. 4 is a side elevational view of the cylinder shown in FIG. 3.

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures.

The device of this invention is referred to generally in FIGS. 1-9 by the reference numeral 10 and is intended to provide a digital ring sizing device. It should be understood that the device 10 may be used to size many different types of cylindrical objects and should not be limited in use to only sizing those types of objects described herein.

Referring initially to FIGS. 1, 2, 3, 4, 5, 6 and 7, the device 10 includes a cylinder 20 removably positioned directly about the selected user finger, without the use of intervening elements, such that the selected user finger is completely surrounded by the cylinder 20 during operating conditions. Such a cylinder 20 includes a middle section 21 that has axially opposed top 22 and bottom 23 ends with threaded outer surfaces 24. Such threaded outer surfaces 24 extend about an entire circumference of the middle section 21. The cylinder 20 further includes coextensively shaped top 25 and bottom 26 sections respectively. The top section 25 and the bottom section 26 and the middle-section 21 have equally sized diameters respectively, and the top and bottom sections 25, 26 are independently and threadably attached to the top and bottom ends 22, 23 of the middle section 21. The top and bottom sections 25, 26 respectively are replaceable when worn, damaged, or lost.

Figure 5:
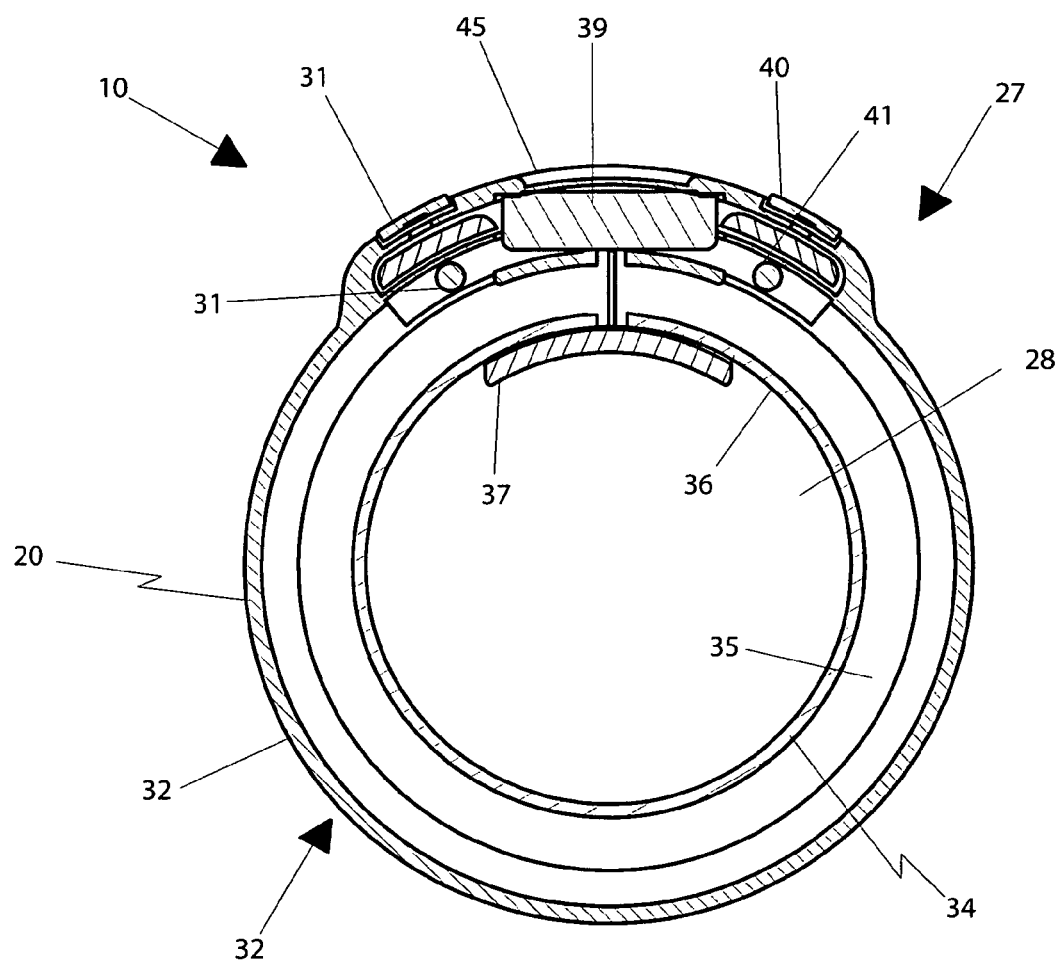
FIG. 5 is a cross sectional view of the cylinder shown in FIG. 4, taken along line 5-5.
Figure 6:
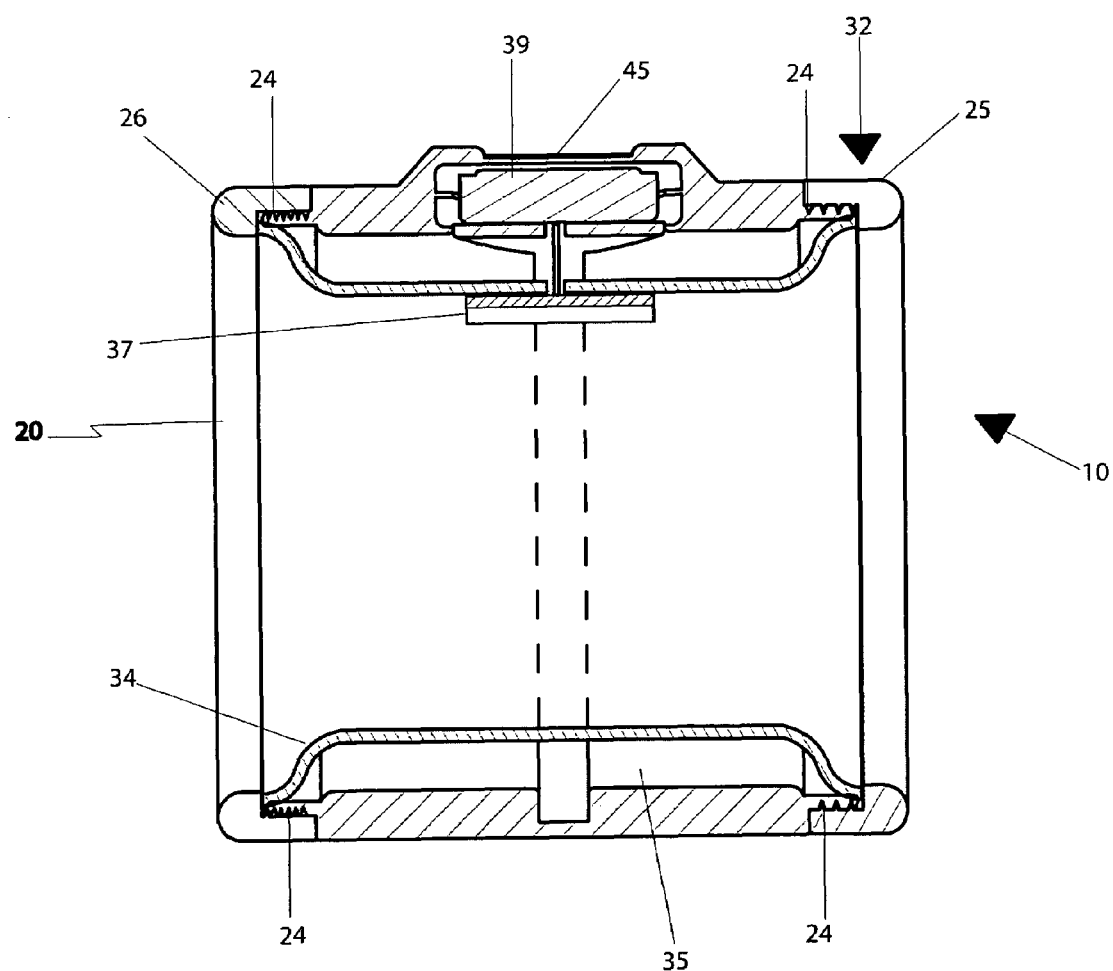
FIG. 6 is a cross sectional view of the cylinder shown in FIG. 2, taken along line 6-6.
Figure 7:
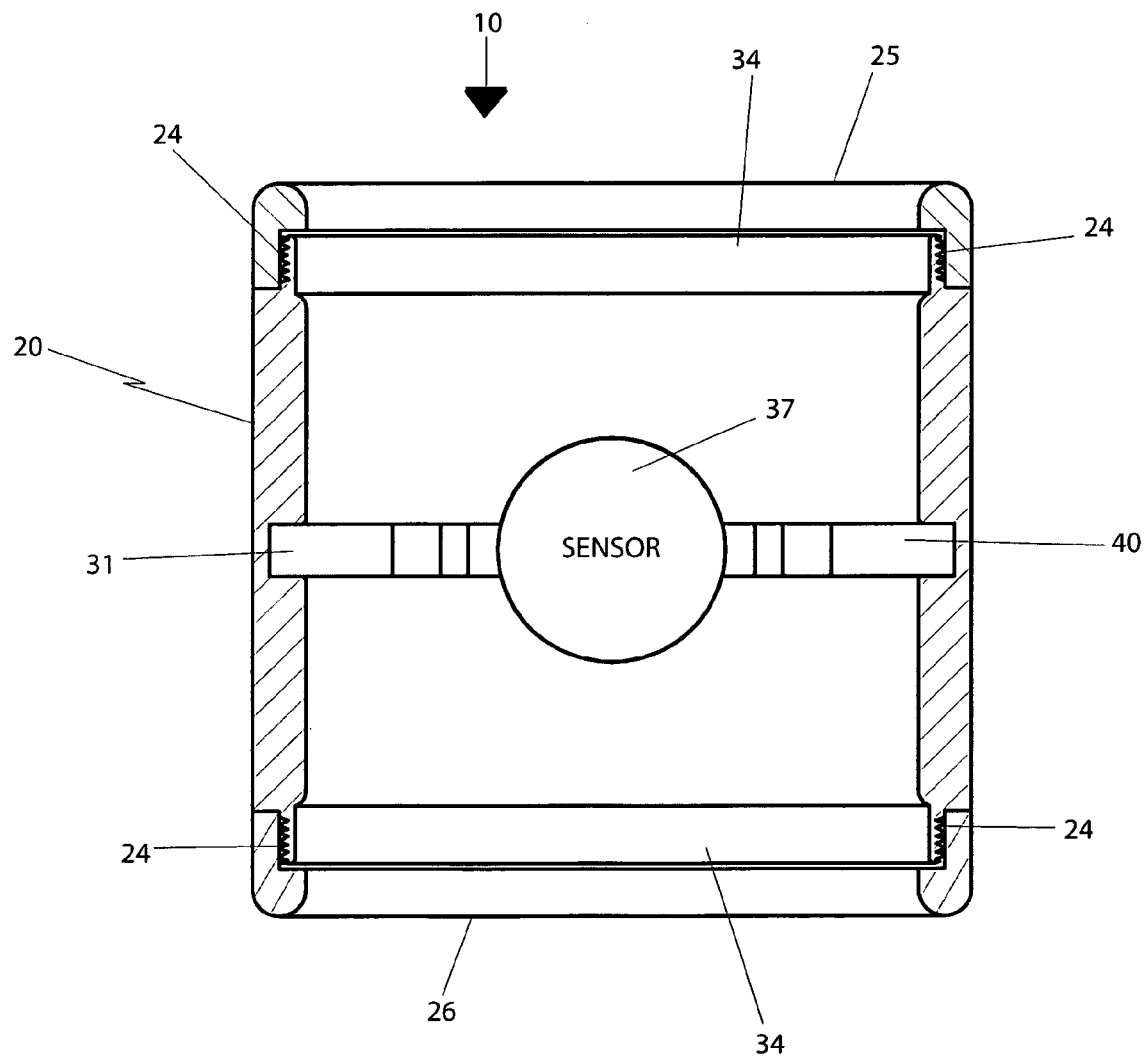
FIG. 7 is a cross sectional view of the cylinder shown in FIG. 3, taken along line 7-7.
Figure 8:
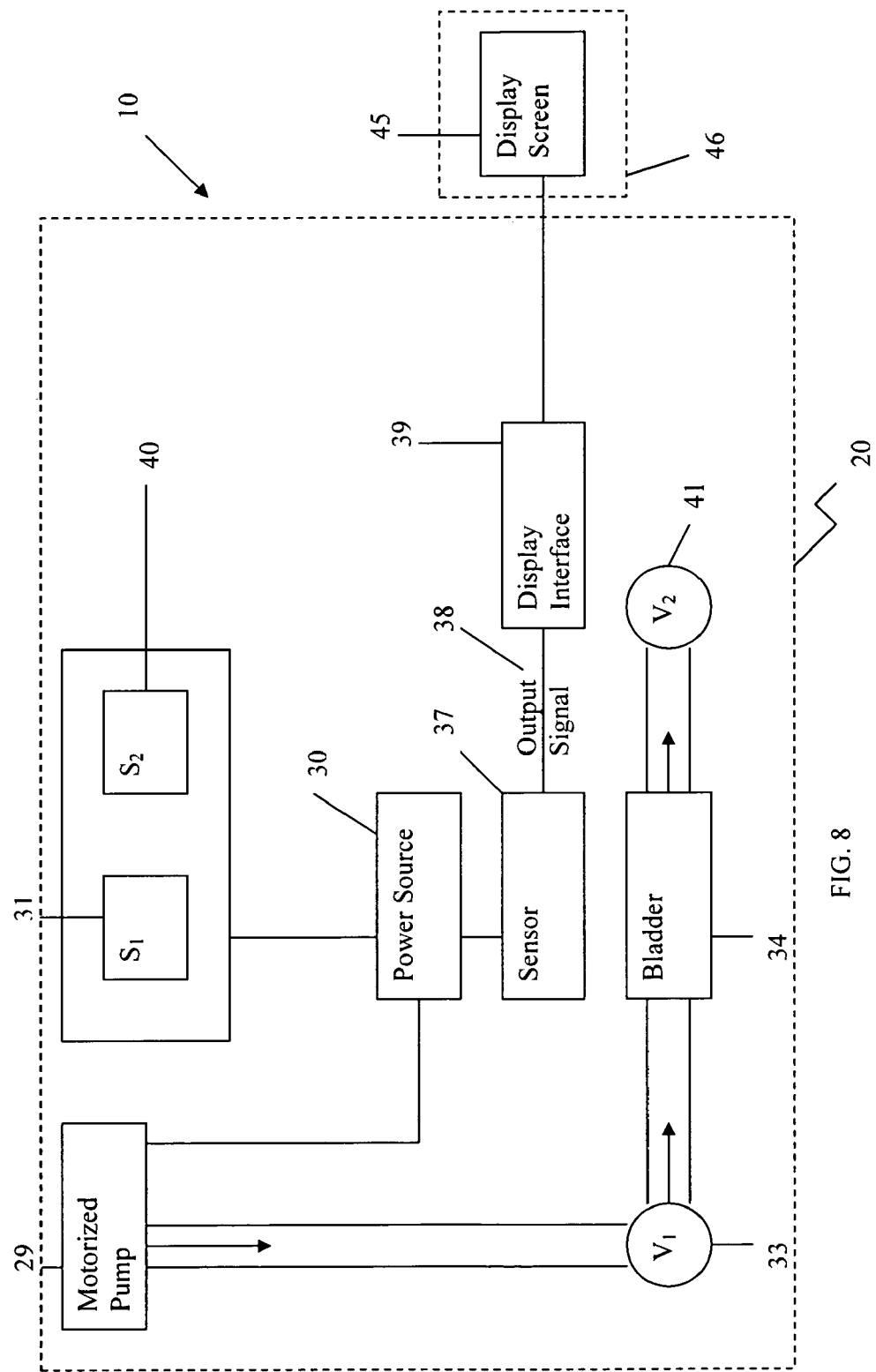
FIG. 8 is a schematic block diagram of the ring size determining mechanism and the visual displaying mechanism respectively.

Referring to FIGS. 5, 6, and 8, the device 10 further includes a mechanism 27 for determining a ring size of the selected user finger. Such a ring size determining mechanism 27 is housed within an interior 28 of the cylinder 20 and connected directly thereto. The ring size determining mechanism 27 includes a motorized pump 29 housed within the interior 28 of the cylinder 20, a power source 30 electrically coupled to the pump 29, and a first toggle switch 31 electrically coupled to the pump 29 and the power source 30 respectively. Such a first toggle switch 31 is disposed on an exterior surface 32 of the cylinder 20 which is essential such that the user can easily manipulate the first toggle switch 31 during operating conditions.

Referring to FIGS. 3, 5, 6, 7 and 8 the ring size determining mechanism 27 further includes a first one-way valve 33 electrically coupled to the first toggle switch 31 and the pump 29 respectively. Such a first one-way valve 33 is opened when the first toggle switch 31 actuates the pump 29. A cylinder-shaped air bladder 34 has a hollow chamber 35 formed therein. Such an air bladder 34 is directly coupled to the first one-way valve 33 and an inner surface of the middle section 21 of the cylinder 20 respectively. The air bladder 34 is coextensively shaped with the middle section 21 of the cylinder 20 and formed from a durably resilient material which is crucial such that the air bladder 34 can be repeatedly expanded and contracted respectively without damage thereto.

Again referring to FIGS. 3, 5, 6, 7 and 8 the pump 29 introduces a quantity of air into the hollow chamber 35 of the air bladder 34 via the first one-way valve 33 when the user manipulates the first toggle switch 31 during operating conditions. The first one-way valve 33 and the first toggle switch 31 cooperate to prohibit the quantity of air from prematurely and undesirably exiting the air bladder 34 thereby allowing the air bladder 34 to remain expanded as desired. The air bladder 34 has an inner surface 36 that expands toward a centrally registered axis thereof and about the selected user finger when the quantity of air is introduced into the hollow chamber 35 of the air bladder 34. An internal air pressure of the air bladder 34 is increased to a predetermined level above an external ambient air pressure level during operating conditions.

Figure 9:
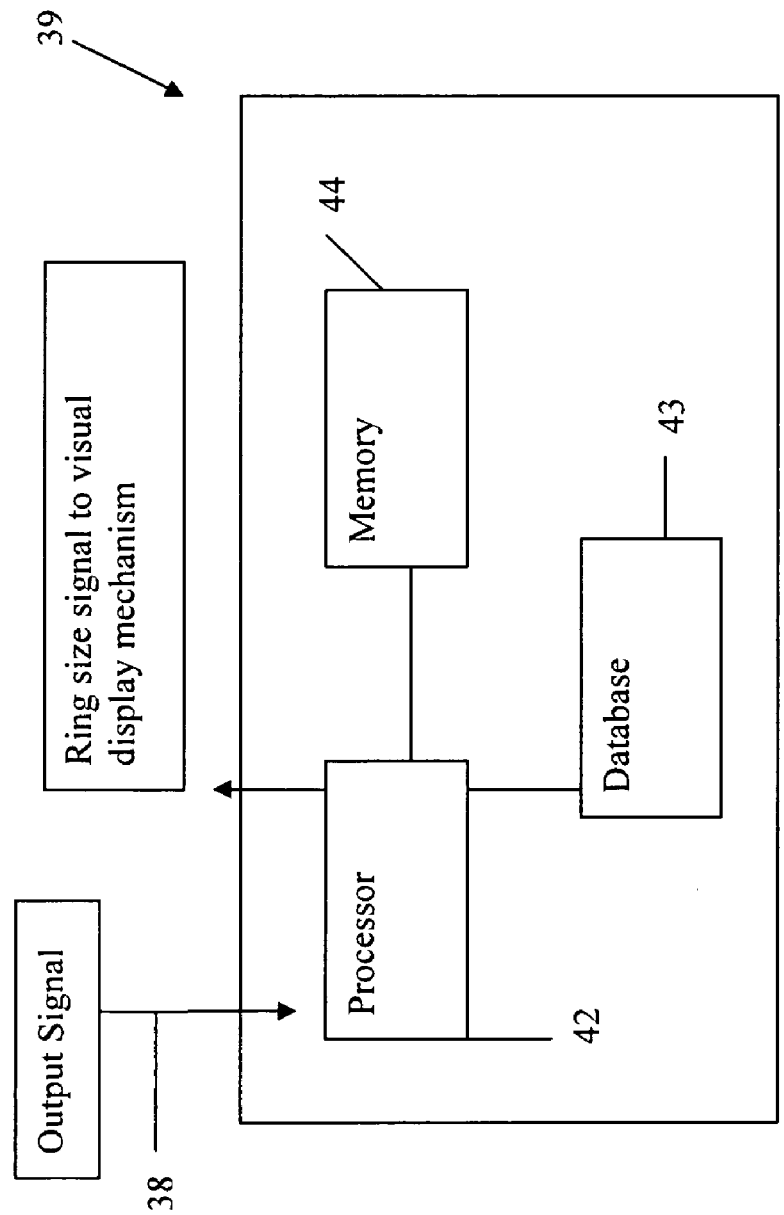
FIG. 9 is a schematic block diagram of the display interface.

Referring to FIGS. 8 and 9, the ring size determining mechanism 27 further includes a pressure sensor 37 attached directly to a top portion of the inner 36 surface of the air bladder 34, without the use of intervening elements, and further is electrically coupled to the power source 30. Such a sensor 37 contacts the selected user finger when the air bladder 34 expands. The sensor 37 generates and transmits an output signal 38 based upon the instant diameter of the air bladder 34 when the sensor 37 contacts the selected user finger. A display interface 39 is electrically coupled to the sensor 37 and housed within the interior of the middle section 21 of the cylinder 20, and receives the output signal 38 from the sensor 37. Such an output signal 38 carries a numerical value corresponding to the detected ring size of the user.

Referring to FIGS. 1, 2, 3, 4, 5 and 8, the ring size determining mechanism 27 further includes a second toggle switch 40 electrically coupled to the power source 30 and disposed on the exterior surface 32 of the cylinder 20 which is essential such that the user can easily manipulate the second toggle switch 40 during operating conditions. Such a second toggle switch 40 is coextensively shaped with the first toggle switch 31. A second one-way valve 41 is electrically coupled to the second toggle switch 40 and directly connected to the air bladder 34 respectively. The second one-way valve 41 cooperates with the first one-way valve 33 to prohibit the quantity of air introduced into the air bladder 34 from prematurely and undesirably exiting the air bladder 34 during operating conditions. The second one-way valve 41 and the second toggle switch 40 cooperate to allow the quantity of air introduced into the air bladder 34 to exit therefrom which is critical such that the internal air pressure of the air bladder 34 is in equilibrium with an external ambient air pressure when the second toggle switch 40 is manipulated by the user. The second toggle switch 40 allows the user to selectively contract the air bladder 34 as desired during operating conditions.

Referring to FIG. 9, the display interface 39 includes a processor 42, a database 43 containing a plurality of ring sizes corresponding to a plurality of detected diameters respectively of the air bladder 34, and a memory 44 electrically coupled to the processor 42 and including software instructions for calculating the ring size of the selected user finger based upon a detected diameter of the air bladder 34. The software instructions include a plurality of operating steps including requesting the detected diameter of the air bladder 34 from the sensor 37, querying the database 43 to locate the detected air bladder 34 diameter, finding an associated one of the ring sizes that matches with the detected air bladder 34 diameter, extrapolating the associated ring size, converting the associated ring size to a numerical value, and transmitting the numerical value to the display screen 45 (herein described below).

Referring to FIG. 8, the device 10 further includes a mechanism 46 for visually displaying the determined ring size of the selected user finger. Such a visual displaying mechanism 46 is directly connected to the exterior surface 32 of the cylinder 20, without the use of intervening elements, and further is electrically coupled to the ring size determining mechanism 27 respectively. The ring size of the user is automatically displayed in numeric characters by the visual displaying mechanism 46 after the ring size determining mechanism 27 calculates the ring size of the selected user finger. The visual displaying mechanism 46 allows the user to visually identify the ring size of the selected user finger as soon as the ring size determining mechanism 27 transmits the numerical value to the display screen 45.

Referring to FIGS. 1, 2, 5, 6 and 8, the visual displaying mechanism 46 includes a liquid crystal display screen 45 integrally attached to the exterior surface 32 of the cylinder 20. Such a display screen 45 is located intermediate of the first toggle switch 31 and the second toggle switch 40 respectively, and is electrically coupled to the display interface 39. The display screen 45 allows the user to monitor the numerical characters being displayed thereon while simultaneously manipulating the first and second toggle switches 31, 40 respectively during operating conditions.

In use, the digital ring sizing device 10 is simple and straightforward to use. First, the user positions the device 10 about the selected user finger to be sized. Next, the user manipulates the first and second toggle switches 31, 40 respectively to expand and contract the air bladder 34 respectively about the selected user finger. Then, the user views the ring size of the selected user finger displayed by the display screen 45.

The first and second toggle switches 31, 40 respectively provide the unexpected benefit of allowing the user to expand and contract the air bladder 34 through a plurality of discrete diameters based upon the selected user finger being sized. In addition, the position of the display screen 45 allows the user to view the size of the selected finger being sized while simultaneously manipulating the first and second toggle switches 31, 40 respectively, thereby overcoming the prior art shortcomings.

A method 10 for assisting a user to easily and accurately determine a ring size of a selected user finger includes the steps of removably positioning a cylinder 20 directly about the selected user finger, without the use of intervening elements, and determining a ring size of the selected user finger. The ring size determining mechanism 27 is housed within an interior of the cylinder 20 and connected directly thereto. The steps further include visually displaying the determined ring size of the selected user finger. The visual displaying mechanism 46 is directly connected to an exterior surface 32 of the cylinder 20, without the use of intervening elements, and further is electrically coupled to the ring size determining mechanism 27 respectively. The ring size of the user is automatically displayed in numeric characters by the visual displaying mechanism 46 after the ring size determining mechanism 27 calculates the ring size of the selected user finger.

The step of determining a ring size of the selected user finger includes the steps of housing a motorized pump 29 within the interior of the cylinder 20, electrically coupling a power source 30 to the pump 29, and electrically coupling a first toggle switch 31 to the pump 29 and the power source 30 respectively. The first toggle switch 31 is disposed on the exterior surface 32 of the cylinder 20. The steps further include electrically coupling a first one-way valve 33 to the first toggle switch 31 and the pump 29 respectively. The first one-way valve 33 is opened when the first toggle switch 31 actuates the pump 29. The steps further include coupling a cylinder-shaped air bladder 34 that has a hollow chamber 35 formed therein directly to the first one-way valve 33 and an inner surface of the middle section 21 of the cylinder 20 respectively, without the use of intervening elements. The air bladder 34 is coextensively shaped with the middle section 21 of the cylinder 20, and is formed from a durably resilient material.

The step of determining a ring size of the selected user finger further includes the step of introducing a quantity of air into the hollow chamber 35 of the air bladder 34 via the first one-way valve 33 and the pump 29 when the user manipulates the first toggle switch 31 during operating conditions. The first one-way valve 33 and the first toggle switch 31 cooperate to prohibit the quantity of air from prematurely and undesirably exiting the air bladder 34. The air bladder 34 has an inner surface 36 that expands toward a centrally registered axis thereof and about the selected user finger when the quantity of air is introduced into the hollow chamber 35 of the air bladder 34. An internal air pressure of the air bladder 34 is increased to a predetermined level above an external ambient air pressure level during operating conditions.

The step of determining a ring size of the selected user finger further includes the step of attaching a pressure sensor 37 directly to a top portion of the inner surface 36 of the air bladder 34, without the use of intervening elements. The sensor 37 is electrically coupled to the power source 30, and contacts the selected user finger when the air bladder 34 expands. The sensor 37 generates and transmits an output signal 38 based upon the instant diameter of the air bladder 34 when the sensor 37 contacts the selected user finger. The steps further include electrically coupling a display interface 39 to the sensor 37. The display interface 39 is housed within the interior of the middle section 21 of the cylinder 20 and receives the output signal 38 from the sensor 37. The output signal 38 carries a numerical value corresponding to the detected ring size of the user.

The step of determining a ring size of the selected user finger further includes the steps of providing a processor 42, providing a database 43 containing a plurality of ring sizes corresponding to a plurality of detected diameters respectively of the air bladder 34, and providing a memory 44 electrically coupled to the processor 42 and including software instructions for calculating the ring size of the selected user finger based upon a detected diameter of the air bladder 34. The software instructions include a plurality of operating steps including requesting the detected diameter of the air bladder 34 from the sensor 37, querying the database 43 to locate the detected air bladder 34 diameter, finding an associated one of the ring sizes that matches with the detected air bladder 34 diameter, extrapolating the associated ring size, converting the associated ring size to a numerical value, and transmitting the numerical value to the display screen 45.

The step of determining a ring size of the selected user finger further includes the steps of electrically coupling a second toggle switch 40 to the power source 30. The second toggle switch 40 is disposed on the exterior surface 32 of the cylinder 20, and is coextensively shaped with the first toggle switch 31. The steps further include electrically coupling a second one-way valve 41 to the second toggle switch 40. The second one-way valve 41 is directly connected to the air bladder 34, without the use of intervening elements. The second one-way valve 41 cooperates with the first one-way valve 33 to prohibit the quantity of air introduced into the air bladder 34 from prematurely and undesirably exiting the air bladder 34 during operating conditions. The second one-way valve 41 and the second toggle switch 40 cooperate to allow the quantity of air introduced into the air bladder 34 to exit therefrom such that the internal air pressure of the air bladder 34 is in equilibrium with the external ambient air pressure when the second toggle switch 40 is manipulated by the user.

The step of visually displaying the determined ring size of the selected user finger includes the step of attaching a liquid crystal display screen 45 to the exterior surface 32 of the cylinder 20. The display screen 45 is located intermediate of the first toggle switch 31 and the second toggle switch 40 respectively, and the display screen 45 is electrically coupled to the display interface 39.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed as new and what is desired to secure by Letters Patent of the United States is:

1. A digital ring sizing device for assisting a user to easily and accurately determine a ring size of a selected user finger, said digital ring sizing device comprising:
   a cylinder removably positioned directly about the selected user finger;
   means for determining a ring size of the selected user finger, said ring size determining means being housed within an interior of said cylinder and connected directly thereto; and
   means for visually displaying the determined ring size of the selected user finger, said visual displaying means being directly connected to an outer surface of said cylinder and further being electrically coupled to said ring size determining means respectively;
   wherein the ring size of the user is automatically displayed by said visual displaying means after said ring size determining means calculates the ring size of the selected user finger;
   wherein said cylinder comprises
   a middle section having axially opposed top and bottom ends, said top and bottom ends respectively having threaded outer surfaces, said threaded outer surfaces extending about an entire circumference thereof;
   coextensively shaped top and bottom sections respectively, said top section and said bottom section and said middle section having equally sized diameters respectively, said top and bottom sections being independently and threadably attached to said top and bottom ends of said middle section;

a motorized pump housed within said interior of said cylinder;

a power source electrically coupled to said pump;

a first toggle switch electrically coupled to said pump and said power source respectively, said first toggle switch being disposed on said exterior surface of said cylinder;

a first one-way valve electrically coupled to said first toggle switch and said pump respectively, said first one-way valve being opened when said first toggle switch actuates said pump;

a cylinder-shaped air bladder having a hollow chamber formed therein, said air bladder being directly coupled to said first one-way valve and an inner surface of said middle section of said cylinder respectively, said air bladder being coextensively shaped with said middle section of said cylinder, said air bladder being formed from a durably resilient material;

wherein said pump introduces a quantity of air into said hollow chamber of said air bladder via said first one-way valve when the user manipulates said first toggle switch during operating conditions, said first one-way valve and said first toggle switch cooperating to prohibit said quantity of air from prematurely and undesirably exiting said air bladder, said air bladder having an inner surface expanded toward a centrally registered axis thereof and about the selected user finger when said quantity of air is introduced into said hollow chamber of said air bladder, an internal air pressure of said air bladder being increased to a predetermined level above an external ambient air pressure level during operating conditions;

a pressure sensor attached directly to a top portion of said inner surface of said air bladder and further being electrically coupled to said power source, said sensor contacting the selected user finger when said air bladder expands, said sensor generating and transmitting an output signal based upon the instant diameter of said air bladder when said sensor contacts the selected user finger; and a display interface electrically coupled to said sensor, said display interface being housed within said interior of said middle section of said cylinder and receiving said output signal from said sensor, said output signal carrying a numerical value corresponding to the detected ring size of the user.

2. The digital ring sizing device of claim 1, wherein said display interface comprises:

a processor;

a database containing a plurality of ring sizes corresponding to a plurality of detected diameters of said air bladder;

a memory electrically coupled to said processor and including software instructions for calculating the ring size of the selected user finger based upon a detected diameter of said air bladder, said software instruction including a plurality of operating steps including a. requesting the detected diameter of said air bladder from said sensor;

b. querying said database to locate the detected air bladder diameter;

c. finding an associated one of said ring sizes that matches with the detected air bladder diameter;

d. extrapolating said associated ring size;

e. converting said associated ring size to a numerical value; and f. transmitting said numerical value to said display screen.

3. The digital ring sizing device of claim 2, wherein said ring size determining means further comprises:

a second toggle switch electrically coupled to said power source and disposed on said exterior surface of said cylinder, said second toggle switch being coextensively shaped with said first toggle switch; and a second one-way valve electrically coupled to said second toggle switch and directly connected to said air bladder respectively, said second one-way valve cooperating with said first one-way valve to prohibit said quantity of air introduced into said air bladder from prematurely and undesirably exiting said air bladder during operating conditions, said second one-way valve and said second toggle switch cooperating to allow said quantity of air introduced into said air bladder to exit therefrom such that the internal air pressure of said air bladder is in equilibrium with an external ambient air pressure when said second toggle switch is manipulated by the user.

4. The digital ring sizing device of claim 3, wherein said visual displaying means comprises:

a liquid crystal display screen integrally attached to said exterior surface of said cylinder, said display screen being located intermediate of said first toggle switch and said second toggle switch respectively, said display screen being electrically coupled to said display interface.

5. A digital ring sizing device for assisting a user to easily and accurately determine a ring size of a selected user finger, said digital ring sizing device comprising:

a cylinder removably positioned directly about the selected user finger;

means for determining a ring size of the selected user finger, said ring size determining means being housed within an interior of said cylinder and connected directly thereto; and means for visually displaying the determined ring size of the selected user finger, said visual displaying means being directly connected to an outer surface of said cylinder and further being electrically coupled to said ring size determining means respectively;

wherein the ring size of the user is automatically displayed by said visual displaying means after said ring size determining means calculates the ring size of the selected user finger, said ring size being displayed in numeric characters;

wherein said cylinder comprises a middle section having axially opposed top and bottom ends, said top and bottom ends respectively having threaded outer surfaces, said threaded outer surfaces extending about an entire circumference thereof;

coextensively shaped top and bottom sections respectively, said top section and said bottom section and said middle section having equally sized diameters respectively, said top and bottom sections being independently and threadably attached to said top and bottom ends of said middle section;

a motorized pump housed within said interior of said cylinder;

a power source electrically coupled to said pump;

a first toggle switch electrically coupled to said pump and said power source respectively, said first toggle switch being disposed on said exterior surface of said cylinder;

a first one-way valve electrically coupled to said first toggle switch and said pump respectively, said first one-way valve being opened when said first toggle switch actuates said pump;

a cylinder-shaped air bladder having a hollow chamber formed therein, said air bladder being directly coupled to said first one-way valve and an inner surface of said middle section of said cylinder respectively, said air bladder being coextensively shaded with said middle section of said cylinder, said air bladder being formed from a durably resilient material;

wherein said pump introduces a quantity of air into said hollow chamber of said air bladder via said first one-way valve when the user manipulates said first toggle switch during operating conditions, said first one-way valve and said first toggle switch cooperating to prohibit said quantity of air from prematurely and undesirably exiting said air bladder, said air bladder having an inner surface expanded toward a centrally registered axis thereof and about the selected user finger when said quantity of air is introduced into said hollow chamber of said air bladder, an internal air pressure of said air bladder being increased to a predetermined level above an external ambient air pressure level during operating conditions;

a pressure sensor attached directly to a top portion of said inner surface of said air bladder and further being electrically coupled to said power source, said sensor contacting the selected user finger when said air bladder expands, said sensor generating and transmitting an output signal based upon the instant diameter of said air bladder when said sensor contacts the selected user finger; and a display interface electrically coupled to said sensor, said display interface being housed within said interior of said middle section of said cylinder and receiving said output signal from said sensor, said output signal carrying a numerical value corresponding to the detected ring size of the user.

6. The digital ring sizing device of claim 5, wherein said display interface comprises:
a processor;
a database containing a plurality of ring sizes corresponding to a plurality of detected diameters respectively of said air bladder;
a memory electrically coupled to said processor and including software instructions for calculating the ring size of the selected user finger based upon a detected diameter of said air bladder, said software instruction including a plurality of operating steps including
  a. requesting the detected diameter of said air bladder from said sensor;
  b. querying said database to locate the detected air bladder diameter;
  c. finding an associated one of said ring sizes that matches with the detected air bladder diameter;
  d. extrapolating said associated ring size;
  e. converting said associated ring size to a numerical value; and
  f. transmitting said numerical value to said display screen.

7. The digital ring sizing device of claim 6, wherein said ring size determining means further comprises:
a second toggle switch electrically coupled to said power source and disposed on said exterior surface of said cylinder, said second toggle switch being coextensively shaped with said first toggle switch; and a second one-way valve electrically coupled to said second toggle switch and directly connected to said air bladder respectively, said second one-way valve cooperating with said first one-way valve to prohibit said quantity of air introduced into said air bladder from prematurely and undesirably exiting said air bladder during operating conditions, said second one-way valve and said second toggle switch cooperating to allow said quantity of air introduced into said air bladder to exit therefrom such that the internal air pressure of said air bladder is in equilibrium with an external ambient air pressure when said second toggle switch is manipulated by the user.

8. The digital ring sizing device of claim 7, wherein said visual displaying means comprises:
a liquid crystal display screen integrally attached to said exterior surface of said cylinder, said display screen being located intermediate of said first toggle switch and said second toggle switch respectively, said display screen being electrically coupled to said display interface.

9. A method for assisting a user to easily and accurately determine a ring size of a selected user finger, said method comprising the steps of:
  a. removably positioning a cylinder directly about the selected user finger;
  b. determining a ring size of the selected user finger, said ring size determining means being housed within an interior of said cylinder and connected directly thereto; and
  c. visually displaying the determined ring size of the selected user finger, said visual displaying means being directly connected to an exterior surface of said cylinder and further being electrically coupled to said ring size determining means respectively;
wherein the ring size of the user is automatically displayed by said visual displaying means after said ring size determining means calculates the ring size of the selected user finger, the ring size being displayed in numeric characters;
wherein said cylinder comprises
a middle section having axially opposed top and bottom ends, said top and bottom ends respectively having threaded outer surfaces, said threaded outer surfaces extending about an entire circumference thereof;
coextensively shaped top and bottom sections respectively, said top section and said bottom section and said middle section having equally sized diameters respectively, said top and bottom sections being independently and threadably attached to said top and bottom ends of said middle section;
wherein step b. comprises the steps of:
  i. housing a motorized pump within said interior of said cylinder;
  ii. electrically coupling a power source to said pump;
  iii. electrically coupling a first toggle switch to said pump and said power source respectively, said first toggle switch being disposed on said exterior surface of said cylinder;
  iv. electrically coupling a first one-way valve to said first toggle switch and said pump respectively, said first one-way valve being opened when said first toggle switch actuates said pump;
  v. coupling a cylinder-shaped air bladder having a hollow chamber formed therein directly coupled to said first one-way valve and an inner surface of said middle section of said cylinder respectively, said air bladder being coextensively shaped with said middle section of said cylinder, said air bladder being formed from a durably resilient material;

vi. introducing a quantity of air into said hollow chamber of said air bladder via said first one-way valve and said pump when the User manipulates said first toggle switch during operating conditions, said first one-way valve and said first toggle switch cooperating to prohibit said quantity of air from prematurely and undesirably exiting said air bladder, said air bladder having an inner surface expanded toward a centrally registered axis thereof and about the selected user finger when said quantity of air is introduced into said hollow chamber of said air bladder, an internal air pressure of said air bladder being increased to a predetermined level above an external ambient air pressure level during operating conditions;

vii. attaching a pressure sensor directly to a top portion of said inner surface of said air bladder, said sensor being electrically coupled to said power source, said sensor contacting the selected user finger when said air bladder expands, said sensor generating and transmitting an output signal based upon the instant diameter of said air bladder when said sensor contacts the selected user finger; and electrically coupling a display interface to said sensor, said display interface being housed within said interior of said middle section of said cylinder and receiving said output signal from said sensor, said output signal carrying a numerical value corresponding to the detected ring size of the user.

10. The method of claim 9, wherein said display interface comprises:

a processor;

a database containing a plurality of ring sizes corresponding to a plurality of detected diameters respectively of said air bladder;

a memory electrically coupled to said processor and including software instructions for calculating the ring size of the selected user finger based upon a detected diameter of said air bladder, said software instruction including a plurality of operating steps including 1. requesting the detected diameter of said air bladder from said sensor;
2. querying said database to locate the detected air bladder diameter;
3. finding an associated one of said ring sizes that matches with the detected air bladder diameter;
4. extrapolating said associated ring size;
5. converting said associated ring size to a numerical value; and
6. transmitting said numerical value to said display screen.

11. The method of claim 10, wherein step b. further comprises the steps of:

ix. electrically coupling a second toggle switch to said power source, said second toggle switch being disposed on said exterior surface of said cylinder, said second toggle switch being coextensively shaped with said first toggle switch; and x. electrically coupling a second one-way valve to said second toggle switch, said second one-way valve being directly connected to said air bladder, said second one-way valve cooperating with said first one-way valve to prohibit said quantity of air introduced into said air bladder from prematurely and undesirably exiting said air bladder during operating conditions, said second one-way valve and said second toggle switch cooperating to allow said quantity of air introduced into said air bladder to exit therefrom such that said internal air pressure of said air bladder is in equilibrium with said external ambient air pressure when said second toggle switch is manipulated by the user.

12. The method of claim 11, wherein step c. comprises the steps of:

i. attaching a liquid crystal display screen to said exterior surface of said cylinder, said display screen being located intermediate of said first toggle switch and said second toggle switch respectively, said display screen being electrically coupled to said display interface.

* * * * *